United States Patent
Smetana et al.

(10) Patent No.: US 9,067,582 B2
(45) Date of Patent: Jun. 30, 2015

(54) DRIVE UNIT COMPRISING AN ELECTRIC MOTOR

(75) Inventors: Tomas Smetana, Herzogenaurach (DE); Philip Wurzberger, Nuremberg (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/345,698

(22) PCT Filed: Sep. 22, 2011

(86) PCT No.: PCT/EP2011/066505
§ 371 (c)(1),
(2), (4) Date: Mar. 19, 2014

(87) PCT Pub. No.: WO2013/041142
PCT Pub. Date: Mar. 28, 2013

(65) Prior Publication Data
US 2014/0235394 A1    Aug. 21, 2014

(51) Int. Cl.
| | |
|---|---|
| F16H 3/72 | (2006.01) |
| B60W 10/115 | (2012.01) |
| B60K 6/365 | (2007.10) |
| B60K 17/16 | (2006.01) |
| F16H 3/54 | (2006.01) |
| B60W 10/08 | (2006.01) |
| F16H 48/11 | (2012.01) |
| B60K 1/00 | (2006.01) |

(52) U.S. Cl.
CPC ............ *B60W 10/115* (2013.01); *F16H 3/725* (2013.01); *B60K 6/365* (2013.01); *B60K 17/165* (2013.01); *F16H 48/11* (2013.01); *B60K 2001/001* (2013.01); *F16H 3/54* (2013.01); *F16H 2200/0021* (2013.01); *F16H 2200/2007* (2013.01); *F16H 2200/2097* (2013.01); *F16H 2200/2082* (2013.01); *B60K 1/00* (2013.01); *B60W 10/08* (2013.01); *B60W 2510/10* (2013.01)

(58) Field of Classification Search
None
See application file for complete search history.

(56) References Cited

U.S. PATENT DOCUMENTS

| | | | |
|---|---|---|---|
| 6,344,008 B1 | 2/2002 | Nagano et al. | |
| 6,783,475 B2 * | 8/2004 | Gazyakan et al. | ............ 475/210 |
| 2004/0018908 A1 | 1/2004 | Gazyakan et al. | |
| 2010/0216593 A1 * | 8/2010 | Ekonen et al. | ................ 475/295 |
| 2011/0136609 A1 | 6/2011 | Knoblauch | |

FOREIGN PATENT DOCUMENTS

| | | |
|---|---|---|
| DE | 10058198 | 6/2002 |
| DE | 102008029287 | 12/2009 |
| DE | 10036966 | 4/2011 |
| DE | 102009056366 | 6/2011 |

* cited by examiner

*Primary Examiner* — Erin D Bishop
(74) *Attorney, Agent, or Firm* — Volpe and Koenig, P.C.

(57) ABSTRACT

A drive unit (1) including an electric motor (2) and a first planetary drive (7) with a first shifting clutch (3) for selecting a first connection between the electric motor (2) and a driven element (6) of the drive unit, and with a second shifting clutch (4) for selecting a second connection between the electric motor (2) and the driven element (6). A transmission connection is formed between the electric motor (2) and the first shifting clutch (3) by the first planetary drive (7).

9 Claims, 1 Drawing Sheet

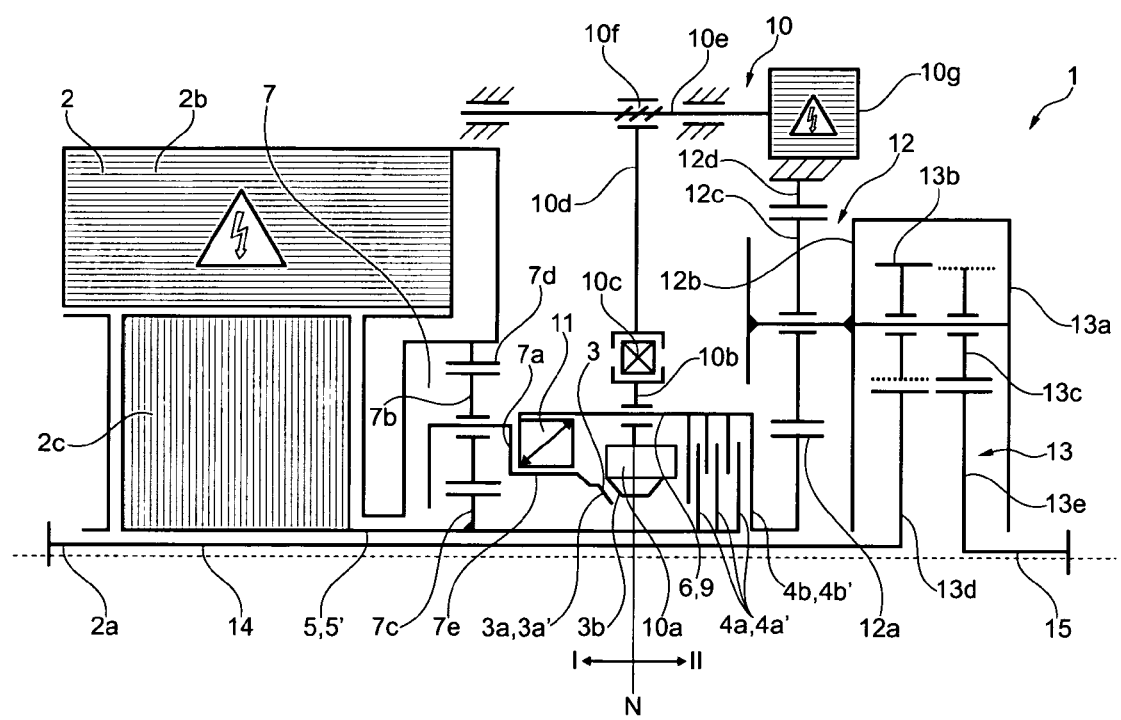

DRIVE UNIT COMPRISING AN ELECTRIC MOTOR

FIELD OF THE INVENTION

The invention relates to a drive unit with an electric motor, a first planetary drive, with a first shifting clutch for selecting a first connection between the electric motor and a driven element of the drive unit, with a second shifting clutch for selecting a second connection between the electric motor and the driven element, wherein a transmission connection is formed between the electric motor and the first shifting clutch by the first planetary drive.

BACKGROUND

DE 10 2008 029 287 B4 shows a drive train for a motor vehicle with an electromotive drive unit. The electromotive drive unit has a set of planets and a shifting clutch package and is actively connected to a differential. The rotor shaft designated as an output shaft of the electric motor is coupled with the sun gear of the set of planets. The shifting clutch package has a first shifting clutch and a second shifting clutch. The first shifting clutch can be engaged and disengaged, wherein a first transmission ratio between the rotor shaft of the electric motor and a driven element designated as the output can be established with the first shifting clutch. The second shifting clutch can also be engaged and disengaged, wherein a second transmission ratio between the rotor shaft of the electric motor and the same driven element can be established with this second shifting clutch.

The drive unit has a planetary drive with a planet carrier. The planet carrier can rotate relative to the rotor shaft. The planetary drive further has planet gears of which each sits on the planet carrier so that it can rotate about its own rotational axis. The planet gears are in meshed engagement with a sun gear and with a ring gear. The ring gear is fixed on a housing section of the electric motor or on the electromotive drive unit. An output shaft of the electric motor is coupled in a rotationally fixed manner with a sun gear.

The planet carrier can be connected to the output via the first shifting clutch. A first actuator arrangement is allocated to the first shifting clutch, wherein this actuator arrangement has a sliding collar. The output is connected to a hollow transmission shaft on which the sliding collar sits in a rotationally fixed manner so that it can move in the axial direction. The shifting collar has a toothed section that corresponds to a matching toothed section on the planet carrier in order to couple the planet carrier in a rotationally fixed manner to the output. For this purpose, the first sliding collar is pushed out of a neutral position in the axial direction in engagement with the matching toothed section.

A second electromagnetic actuator arrangement with a second sliding collar is allocated to the second shifting clutch, wherein the output shaft of the electric motor and the output can be coupled to each other in a torque transmitting manner by means of the sliding collar.

SUMMARY

The object of the invention is to create a simple drive unit that requires little installation space.

The invention relates to an electromotive drive unit with an electric motor and two shifting clutches with which a connection between an output shaft of the electric motor to a driven element can be engaged and disengaged selectively. The output shaft is the rotor shaft of the electric motor or a shaft coupled with the rotor shaft in a torque transferring manner.

Coupled in a rotationally fixed manner means, in each case described with the invention, that the rotational direction and rotational speed of the elements that are coupled with each other and can rotate about the rotational axis are always the same and these are in active connection with each other, that is, they are connected, for transmitting torque in a torque transferring manner.

The drive unit has a first planetary drive with a first planet carrier. The first planet carrier can rotate about the rotational axis relative to the rotor shaft. First planet gears are supported with a radial distance to the rotational axis of the drive unit on the planet carrier, wherein each planet gear sits on the first planet carrier so that it can rotate about its own rotational axis. The rotational axis of the drive unit corresponds to the rotational axis of the rotor shaft of the electric motor. The rotational axes are arranged with a radial distance and parallel to the rotational axis. The first planet gears are in meshed engagement with a first sun gear and with a first toothed section of a first ring gear. The first ring gear is fixed on a housing section of the electric motor or on the electromotive drive unit, so that the stator and the first ring gear are coupled with each other in a stationary way. The first ring gear can also be formed alternatively only by the first toothed section. The rotor shaft of the electric motor is coupled with the first sun gear in a rotationally fixed manner. The sun gear preferably sits fixed on the rotor shaft or on the output shaft.

A first coupling element of a first shifting clutch is coupled or connected with an element of the first planetary drive in a rotationally fixed manner about the rotational axis. The element is the planet carrier. The first shifting clutch can be engaged and disengaged and has the first clutch element and at least one second clutch element. In addition, an actuator element is allocated to the first shifting clutch, wherein the first shifting clutch can be disengaged and engaged with this element. The first clutch element and the second clutch element can be brought into active connection and disconnected with each other repeatedly with a non-positive friction fit by means of the actuator element.

The second clutch element is coupled in a rotationally fixed manner with the driven element, for example, by means of a transmission shaft, or is connected directly to the driven element. Accordingly, when the first shifting clutch is engaged, the first planet carrier and the transmission shaft or the first planet carrier and the driven element are coupled with each other directly in a rotationally fixed manner and are separated from each other again when the first shifting clutch is disengaged. Because the output shaft is actively connected in a torque transmitting manner via the first sun gear and via the first planet gears to the first planet carrier, wherein the planet gears in meshed engagement are supported on the first ring gear, a transmission-like first connection that is an active connection can be engaged and disengaged, that is, switched, between the rotor shaft and the driven element via the transmission of the planetary drive and by the first shifting clutch.

The rotor shaft is coupled in a rotationally fixed manner with at least one third clutch element of a second shifting clutch. The second shifting clutch can be engaged and disengaged and is formed from the at least third clutch element and an at least fourth clutch element. The fourth clutch element is coupled in a rotationally fixed manner to the driven element. Furthermore, at least the same actuator element is allocated to the second shifting clutch, wherein also the first shifting clutch is actuated with this actuator element. The actuator element is consequently also provided for engaging and disengaging the second shifting clutch.

The second shifting clutch is advantageously a friction clutch in which the third clutch element and the fourth clutch element can be brought into active connection and separated with each other repeatedly with a non-positive friction fit by means of the actuator element.

The third clutch element is advantageously coupled on the shaft side to the rotor shaft or the output shaft and the fourth clutch element is coupled on the housing side to the driven element, e.g., via the transmission shaft or directly to the driven element, in a rotationally fixed manner about the rotational axis. When the second shifting clutch is engaged, the rotor shaft and the driven element are coupled in a rotationally fixed manner, for example, with each other via the transmission shaft or directly with each other, and also with or without slip, for a second connection, another active connection. When the second shifting clutch is disengaged, the second active connection is separated again.

On the shaft side means, in each case described with the invention, sitting on a shaft or journal or the like or held on the outside, and on the housing side means sitting on the inside accordingly or held on the inside or sitting on a housing.

The driven element is also connected, apart from with the second clutch element, to a track of a third clutch in a rotationally fixed manner about the rotational axis. This connection is realized again, for example, via the transmission shaft. The third clutch is an autonomously engaging and disengaging freewheel clutch.

The freewheel clutch is a non-positive fit latching clutch that functions by friction and according to the principle of the roller latch or friction latch. The freewheel clutch has at least one drive clutch part and a driven clutch part. The drive clutch part sits on an element of the first planetary drive and is driven by the rotor shaft of the electric motor via the planetary drive when the electric motor is running. The driven clutch part is driven at the same rotational speed and the same direction of rotation, that is, for synchronized operation, about the rotational axis of the clutch parts and the element by the drive clutch part in the rotational sense of the element that can be rotated about the rotational axis of the rotor shaft. If the driven clutch part overtakes the drive clutch part, i.e., the rotational speed of the driven clutch part is greater than that of the drive clutch part when the clutch parts have the same direction of rotation, the freewheel clutch becomes disengaged. The latter also applies if the direction of rotation of the drive clutch part becomes different than that of the driven clutch part.

Clamping elements, for example, clamping bodies or clamping rollers or balls, are arranged between mutually opposite tracks of the clutch parts. The tracks are formed optionally on rings that are pressed onto or into the shaft or housing or are formed directly on the shaft (e.g., on the planet carrier) or on the housing (for example, on the transmission shaft or on the driven element). For the case of synchronized running, the two clutch parts are connected to each other in a torque manner via the clamping elements and in this way torque can be transmitted.

The track of the drive clutch part of the freewheel clutch is advantageously allocated to the planet carrier of the first planetary drive in a rotationally fixed manner and is formed, for example, on the outside on a rotational section of the planet carrier or on a ring pressed onto the rotational section. The second track is allocated to the driven element or the transmission shaft connected to the driven element in a torque transmitting manner. Because the first track is connected in a torque transmitting manner to the first planet carrier and the first sun gear is connected to the rotor shaft or output shaft in a torque transmitting manner, the rotor shaft is actively connected in a transmission-like manner to the freewheel clutch via the first planetary drive. The second track of the freewheel clutch is connected to the driven element in a rotationally fixed manner, as already described above.

The freewheel clutch latches when the first track of the freewheel clutch rotates with the planet carrier driven by the rotor shaft via the planetary drive in the rotational drive direction of the planet carrier. The direction of rotation and rotational speed of the drive and driven clutch parts are equal to that of the planet carrier (synchronized running). In this way, a torque transmitting connection between the first track and the second track and thus a torque transmitting connection between the element of the planet carrier and the transmission shaft or the driven element is formed via the clamping bodies or rollers. Because the rotor shaft is actively connected via the first sun gear and via the first planet gears to the first planet carrier, wherein the first planet gears are supported on the first ring gear, a third connection, an active connection, can be made or broken autonomously between the rotor shaft and the driven element by means of the freewheel clutch, wherein a transmission-like connection is constructed between the rotor shaft and the freewheel clutch via the transmission of the planetary drive. The freewheel clutch is autonomously decoupled, i.e., runs freely, if the driven clutch part overtakes the planet carrier or the drive clutch part in the direction of rotation.

The invention provides the actuation of both shifting clutches with only one actuator arrangement and with only one actuator element. The actuator element has a two-sided design, on one side, acting on the first shifting clutch and, on the other side, acting on the second clutch. In-between, the actuator element optionally moves into a neutral position from which it can be selectively moved to one side or the other for selecting the first shifting clutch or the second shifting clutch. The actuator element is formed accordingly acting in each of two active directions on one of the shifting clutches. The active directions are rectified with the rotational axis advantageously in the axial direction, so that the actuator element can move in the axial direction between the first shifting clutch and a clutch element of the second shifting clutch.

Such an arrangement requires less installation space compared with the arrangements according to the prior state of the art, which is then especially important if the drive unit with the rotational axis of the electric motor is installed transverse to the direction of travel in the vehicle, for example, on a rear axle. Alternatively, the drive unit with the rotational axis of the electric motor is installed oriented longitudinally in the vehicle. Furthermore, a connection between the output element and other transmission arrangements can be realized by an angle drive. In addition, reliable and energy-saving designs for driving the actuator element can be provided. The drive of the actuator element is advantageously an electromotive drive, optionally an electromagnetic, mechanical, or hydraulic drive. A transmission-like connection can be formed between the drive of the actuator element and the actuator element.

The actuator element is formed, for example, by two pressure pistons that move in the axial direction and can be driven with a pressurizing medium, wherein one of these pistons is provided for selecting the first shifting clutch and the other is provided for selecting the second shifting clutch. Preferably, however, the actuator element is a shifting or sliding collar that can move in the axial direction and acts in an axial direction for engaging or disengaging the first shifting clutch, for example, on the first clutch element or on the second clutch element. In the other opposite direction, the shifting collar/sliding collar acts on the third or the fourth clutch element, in order to engage or disengage the second shifting clutch. Accordingly, the sliding collar is selectively allocated to the first planet carrier preferably of the transmission shaft in a rotationally fixed manner about the rotational axis but movable in the axial direction.

According to the invention, the first shifting clutch and the second shifting clutch are clutches that differ from each other by type, advantageously two different friction clutches, wherein one of the clutches is formed as a single-disk or multi-disk friction clutch and the other is formed as a cone clutch. In this way it can be advantageously adapted to different requirements on friction power and clutch speeds or to the size of the torque to be transmitted.

The multi-disk clutch advantageously has disks of which at least one can move in the axial direction on the others for the purpose of a friction fit. In this case, the driven element or the transmission shaft is provided with an outer disk carrier and an inner disk carrier is connected to the planet carrier or to the output shaft or rotor shaft.

In the cone clutch, the clutch elements are friction rings and selectively also claws or toothed sections. The cone clutch is selectively formed as a synchronous clutch with one or more friction cones or conical friction rings with which an interference fit between the clutch elements can be optionally made by means of claws or toothed sections. A construction of the invention provides that a friction cone or claws are formed on the actuator element or mounted in a rotationally fixed manner.

The first shifting clutch is advantageously the cone clutch and the second shifting clutch is preferably the disk clutch/plate clutch.

The driven element is advantageously a second sun gear of a second planetary drive, but can also be some other type of gearwheel or element for transmitting power—e.g., a drive shaft or driven shaft in a motor vehicle. With the driven element, for example, power can be transmitted to a differential or some other kind of transmission, from which torque can be distributed to two axle shafts of a driven vehicle axle. The driven element can also be coupled with a shaft driven by another drive unit and is then, for example, a spur gear or a bevel gear.

One construction of the invention provides a second planetary drive with the second sun gear that is further formed from a second planet carrier, second planet gears, and a second ring gear. The second planet gears are held on the second planet carrier with a radial distance to the rotational axis so that they can rotate about their own rotational axes and are in meshed engagement with the second sun gear and the second ring gear. The second planet carrier can rotate about the rotational axis and is connected to a housing of a differential. Accordingly, the electric motor, first planetary drive, the shifting clutches, and the second planetary drive are arranged coaxial to each other. Alternatively, the planet carrier is the housing of the differential. The differential has compensating gears that are supported so that they can rotate in the housing and are in meshed engagement with two driven gears. Each of the driven gears is connected in a torque transmitting manner to an axle shaft.

According to another construction of the invention, the differential is a planet differential whose housing is a third planet carrier. In the housing, as compensating gears, third planet gears are in meshed engagement with one of the two driven gears and fourth planet gears are in meshed engagement with the other driven gear. Each driven gear is a sun gear accordingly.

BRIEF DESCRIPTION OF THE DRAWINGS

The invention will be described in more detail below with reference to an embodiment shown in FIG. 1.

DETAILED DESCRIPTION OF THE PREFERRED EMBODIMENT

FIG. 1 shows a schematic diagram of an electromotive drive unit 1 with an electric motor 2, two shifting clutches 3 and 4, and also a freewheel clutch 1, a first planetary drive 7, a second planetary drive 12, and a differential 13. An output shaft 5 of the electric motor 2 can be engaged and disengaged with a driven element 6 selectively with the shifting clutches 3 and 4. The output shaft 5 is the rotor shaft 5' of the electric motor 2.

The driven element 6 is either constructed as a transmission shaft 9 or is fixed to this transmission shaft. The transmission shaft 9 is a hollow cylindrical component in which at least the clutches 3, 4, and 11, as well as an actuator element 10a of an actuator arrangement 10 are integrated.

The drive unit 1 has a first planetary drive 7 with a first planet carrier 7a. The first planet carrier 7a can rotate about the rotational axis 2a of the rotor shaft 5' relative to the rotor shaft 5'. First planet gears 7b are supported on the planet carrier 7a with a radial distance to the rotational axis 2a. Of the planet gears 7b, each can rotate about a separate rotational axis 7b'. The rotational axes 7b' are arranged with a radial distance and parallel to the rotational axis 2a. The first planet gears 7b are in meshed engagement with a first sun gear 7c and with a first toothed section of a first ring gear 7d. The first ring gear 7d is fixed on a housing section 8 of the electric motor 2, so that the stator 2b and the first ring gear 7d are coupled to each other in a stationary manner. The rotor shaft 2a of the electric motor 2 is connected to the rotor 2c and is coupled to the first sun gear 7c in a rotationally fixed manner. The first sun gear 7c sits fixed on the output shaft 5.

A first clutch element 3a of the first shifting clutch 3 is fixed in the form of a conical frictional surface 3a' that can also be constructed on a conical ring made from sheet metal on the first planet carrier 7a. A second clutch element 3b is connected to a transmission shaft 9 in a rotationally fixed manner.

The actuator element 10a of the actuator arrangement 10 is allocated to the first shifting clutch 3 and the first shifting clutch 3 can be engaged and disengaged with this element. The actuator element 10a is a sliding collar that can be shifted in the axial direction from the neutral position N to the settings I and II shown in FIG. 1.

The second clutch element 3b is coupled via the actuator element 10a in a rotationally fixed manner with the driven element 6 via the transmission shaft 9 and in this case a conical frictional surface 3b' that is either constructed directly on the actuator element 10a or on a conical friction ring made from sheet metal. In the latter case, the friction ring is fixed on the actuator element. The frictional surfaces 3a' and 3b' are adapted to each other in terms of their dimensions and surfaces for the purpose of a frictional connection when the shifting clutch 3 is engaged. The first clutch element 3a and the second clutch element 3b can be actively connected and separated to each other repeatedly in a non-positive frictional manner by means of the actuator element 10a.

The rotor shaft 5' is coupled in a rotationally fixed manner to at least one third clutch element 4a of the second shifting clutch 4. The second shifting clutch 4 can be engaged and disengaged and is formed from the at least third clutch element 4a in the form of inner disks 4a' and an at least fourth clutch element 4b. The fourth clutch element 4b is outer disks 4b' coupled with the driven element 6 in a rotationally fixed manner. The same actuator element 10a is allocated to the second shifting clutch 4 and the first shifting clutch 3 is also actuated with this element. The actuator element 10a is consequently also provided for engaging and disengaging the first shifting clutch 3 and the second shifting clutch 4.

The freewheel clutch 11 sits on the outside on a rotational section 7e of the planet carrier 7 and is arranged on the inside in the transmission shaft 9 in a torque transmitting manner. The rotor shaft 5' is actively connected like a transmission with the freewheel clutch 11 via the transmission of the first planetary drive 7.

Because the rotor shaft 5' is actively connected to the first planet carrier 7a via the first sun gear 7c and the first planet gears 7b, wherein the first planet gears 7b are supported on the first ring gear 7d, an autonomously switching third active connection can be established between the rotor shaft 5' and the driven element 6 by means of the freewheel clutch 11.

The actuator arrangement 10 has the actuator element 10a, a guide 10b, a guide bearing 10c concentric to the rotational axis 2a, a transmission element 10d, a drive shaft 10e with threaded drive 10f, and an actuator 10g. The drive shaft 10e can be driven in a rotating or oscillating manner by the actuator 10g parallel to the rotational axis 2a. The threaded drive is provided for converting the rotations of the drive shaft 10e into translational movements on the transmission element 10d. The transmission element 10d can be moved in the axial direction by means of the threaded drive 10f, but cannot rotate. The guide 10b can rotate together with the transmission shaft 9 about the rotational axis 2a and can be moved in the axial direction relative to the transmission shaft 9 fixed on the transmission shaft 9 or on the driven element 6. Therefore, the guide bearing 10c is arranged at the interface between the transmission element 10d that can move only in the axial direction and the rotating guide 10b, wherein the rotating guide 10b can be supported by this bearing on the transmission element 10d that is stationary or moves in the axial direction. The transmission element 10d can have, for example, a shift fork. The actuator element 10a is locked in rotation with the guide 10b and is connected to this guide so that it can move in the axial direction.

The driven element 6 is a second sun gear 12a of a second planetary drive 12 or is connected to this drive. The second planetary drive 12 is further formed from a second planet carrier 12b, second planet gears 12c, and a second ring gear 12d. The second planet gears 12c are held on the second planet carrier 12b so that they can rotate about separate rotational axes 12c' with a radial distance to the rotational axis 2a and are in meshed engagement with the second sun gear 12a and the second ring gear 12d. The second ring gear 12d is fixed on a housing section 8. The second planet carrier 12b can rotate about the rotational axis 2a and is connected to a housing 13a that is the differential cage of the differential 13.

The electric motor 2, first planetary drive 7, the shifting clutches 3 and 4, and the second planetary drive 12 are arranged coaxial to each other.

The differential 13 is a planetary differential whose differential cage 13a is a third planet carrier 13a. Two sets of third planet gears 13b and fourth planet gears 13c as compensating gears are supported on the planet carrier 13a so that they can rotate, wherein these planet gears are in meshed engagement with each other. In addition, the third planet gears 13b are in meshed engagement with the driven gear 13d and the fourth planet gears 13c are in meshed engagement with the driven gear 13e. The driven gears 13d or 13e are sun gears 13d or 13e. Each driven gear 13d or 13e is connected to an axle shaft 14 and 15, respectively. Each axle shaft 14 and 15 leads to a not-shown vehicle wheel. The axle shaft 14 is guided through the electric motor 2 and in this way through the hollow rotor shaft 5'.

Five operating states of the drive unit will be described below:

Operating state 1—driving the vehicle by a different drive source or when stopped: the shifting clutches 4 and 5 are open. The actuator element 10a in is position N. The freewheel clutch 11 does not interlock. The electric motor 2 is switched off.

Operating state 2—$1^{st}$ gear: the freewheel clutch 11 is closed. The actuator element is in position N. The shifting clutches 3 and 4 are open. An active connection transmitting torque between the rotor shaft 5' and the driven element 6 is established such that the freewheel clutch 11 is autonomously engaged, i.e., interlocked. The power of the electric motor in traction mode is transmitted from the rotor shaft 5' via the first sun gear 7c to the first planet gears 7b that are here supported on the first ring gear 7d and the first planet carrier 7a is carried along. The gear shaft 9 and thus the driven element 6 are driven in a rotating manner by the rotor shaft via the second planetary transmissions and via the freewheel clutch. The power flows via the second sun gear 12a into the second planetary drive 12 and from there into the differential 13, where the torque is distributed to the axle shafts 14 and 15.

Operating state 3—$2^{nd}$ gear: the actuator element is in position II. The freewheel clutch 11 and the shifting clutch 3 are disengaged. The shifting clutch 4 is engaged. An active connection transmitting torque between the rotor shaft 5' and the driven element is established by the engaged shifting clutch 4. The power of the electric motor 2 flows in traction mode from the rotor shaft 5' via the closed shifting clutch 4 to the driven element and thus to the second sun gear 12a. The power flows via the second sun gear 12a into the second planetary drive 12 and from there into the differential 13, where the torque is distributed to the axle shafts 14 and 15.

Operating state 4—overrun mode in $1^{st}$ gear: the actuator element 10a is in position I. The freewheel clutch 11 is free and the shifting clutch 4 is disengaged. The shifting clutch 3 is engaged. Torque from the axle shafts 14 and 15 are combined with the differential 13. The power flows from the differential cage 13a backwards via the second planetary drive 12 to the driven element 6 and via the engaged shifting clutch 3 and via the first planetary drive 7 to the rotor shaft 5' that is thus driven for the purpose of recapturing energy.

Operating state 5—overrun mode in $2^{nd}$ gear: the actuator element 10a is in position II. Torque from the axle shafts 14 and 15 is combined with the differential 13. The power flows from the differential cage 13a backwards via the second planetary drive 12 to the driven element 6 and via the engaged shifting clutch 4 to the rotor shaft 5' that is thus driven for the purpose of recapturing energy.

When the shifting clutch 3 is engaged, the actuator element 10a is shifted into position I in the axial direction. For engaging the shifting clutch 4, the actuator element 10a is moved into position II in the axial direction. For disengaging, the actuator element 10a is moved back into position N in both cases.

The actuator element 10a is driven by means of the actuator 10g. For this purpose, the drive shaft 10e of the actuator 10g is driven or oscillated to rotate. The rotations are converted at the threaded drive 10f into translational movements and transmitted via the transmission element 10d to the guide 10b. Therefore, the actuator element 10a is moved in the axial direction. In position I, the actuator element 10a is pressed by means of the conical frictional surface 3b' onto the conical frictional surface 3a'. In position II, the disks are pressed together by means of lever mechanisms or into a straight line under the effect of axial forces of the actuator element 10a or by spring forces freed by means of the actuator element 10a.

| Reference symbols | |
|---|---|
| 1 | Drive unit |
| 2 | Electric motor |
| 2a | Housing |
| 2b | Stator |
| 2c | Rotor |
| 3 | First shifting clutch |
| 3a | First clutch element |
| 3a' | Conical frictional surface |
| 3b | Second clutch element |
| 3b' | Conical frictional surface |
| 4 | Second shifting clutch |
| 4a | Third clutch element |
| 4a' | Inner disk |
| 4b | Fourth clutch element |
| 4b' | Outer disk |
| 5 | Output shaft |
| 5' | Rotor shaft |
| 6 | Driven element |
| 7 | First planetary drive |
| 7a | First planet carrier |
| 7b | First planet gears |
| 7b' | Rotational axis |
| 7c | First sun gear |
| 7d | Ring gear |
| 7e | Rotational section |
| 8 | Housing section |
| 9 | Transmission shaft |
| 10 | Actuator arrangement |
| 10a | Actuator element |
| 10b | Guide |
| 10c | Guide bearing |
| 10d | Transmission element |
| 10e | Drive shaft |
| 10f | Threaded drive |
| 10g | Actuator |
| 11 | Freewheel clutch |
| 12 | Second planetary drive |
| 12a | Second sun gear |
| 12b | Second planet carrier |
| 12c | Second planet gear |
| 12c' | Rotational axis |
| 12d | Second ring gear |
| 13 | Differential |
| 13a | Housing/differential cage/third planet carrier |
| 13b | Compensating gear/third planet gear |
| 13c | Compensating gear/fourth planet gear |
| 13d | Driven gear/sun gear |
| 13e | Driven gear/sun gear |
| 14 | Axle shaft |
| 15 | Axle shaft |

The invention claimed is:

1. A drive unit comprising an electric motor, a first planetary drive, a first shifting clutch for selecting a first connection between the electric motor and a driven element of the drive unit, a second shifting clutch for selecting a second connection between the electric motor and the driven element, wherein a transmission connection is formed between the electric motor and the first shifting clutch by the first planetary drive, the first and second shifting clutches are engageable and disengagable by a common actuator element of an actuator arrangement acting selectively on both of the shifting clutches.

2. The drive unit according to claim 1, wherein the shifting clutches differ from each other by type of friction clutch.

3. The drive unit according to claim 2, wherein both of the shifting clutches are friction clutches, one of the shifting clutches is a single-disk or multi-disk clutch and the other shifting clutch is a clutch with conical frictional surfaces.

4. The drive unit according to claim 1, wherein the actuator element is a sliding collar that is coupled with the driven element, the sliding collar is supported for movement in an axial direction and is fixed in rotation.

5. The drive unit according to claim 1, wherein the actuator element is drivable in an electromotive manner.

6. The drive unit according to claim 1, wherein the first planetary drive has a first planet carrier, the first planet carrier carries first planet gears that are in meshed engagement with a first sun gear, wherein the first sun gear is sitting on an output shaft of the electric motor in a rotationally fixed manner and the first planet gears are in meshed engagement with a first ring gear, the first ring gear fixed on a housing of the drive unit, and the first planet carrier and the driven element are actively connected and separated again by the first shifting clutch and by a freewheel clutch.

7. The drive unit according to claim 1, wherein the driven element is connected to a gearwheel in a torque transmitting manner, and a transmission connection is formed between the first and second shifting clutches and a differential by the gearwheel.

8. A drive unit comprising an electric motor, a first planetary drive, a first shifting clutch for selecting a first connection between the electric motor and a driven element of the drive unit, the driven element is connected to a gearwheel in a torque transmitting manner, a second shifting clutch for selecting a second connection between the electric motor and the driven element, wherein a transmission connection is formed between the electric motor and the first shifting clutch by the first planetary drive, the first and second shifting clutches are engageable and disengagable by a common actuator element of an actuator arrangement acting selectively on both of the shifting clutches, and wherein a transmission connection is formed between the first and second shifting clutches and a differential by the gearwheel, wherein the transmission connection between the first and second shifting clutches and the differential is formed by a second planetary drive, the gearwheel is a second sun gear of the second planetary drive that is in meshed engagement with second planet gears that are supported for rotation and the second planet gears are held on a second planet carrier and the second planet gears are in meshed engagement with a second ring gear that is fixed on a housing of the drive unit.

9. The drive unit according to claim 8, wherein the second planet carrier of the second planetary drive is connected to a differential cage of the differential.

* * * * *